United States Patent
Zhang et al.

(10) Patent No.: US 8,363,593 B2
(45) Date of Patent: Jan. 29, 2013

(54) METHOD FOR CARRYING DOWNLINK CONTROL INFORMATION FOR AN ENHANCED UPLINK DEDICATED CHANNEL

(75) Inventors: Wenfeng Zhang, Edison, NJ (US);
Jung-Tao Liu, Randolph, NJ (US);
Nandu Gopalakrishnan, Chatham, NJ (US)

(73) Assignee: Alcatel Lucent, Paris (FR)

( * ) Notice: Subject to any disclaimer, the term of this patent is extended or adjusted under 35 U.S.C. 154(b) by 2156 days.

(21) Appl. No.: 10/289,048

(22) Filed: Nov. 6, 2002

(65) Prior Publication Data
US 2004/0085924 A1    May 6, 2004

(51) Int. Cl.
*H04W 4/00*    (2009.01)
(52) U.S. Cl. ............... 370/328; 370/310.2; 370/320; 370/322; 370/335; 370/342; 455/410; 455/432.1; 455/434; 455/435.1; 455/450; 455/455; 455/464
(58) Field of Classification Search ............... 370/310.2, 370/328, 320, 322, 335, 342; 455/410.2, 455/432.1, 434, 435.1, 0.2, 450, 455, 464
See application file for complete search history.

(56) References Cited

U.S. PATENT DOCUMENTS

| | | | | |
|---|---|---|---|---|
| 5,182,753 A * | 1/1993 | Dahlin et al. | ............... | 714/749 |
| 5,285,199 A * | 2/1994 | Pocek | ............... | 370/474 |
| 5,293,377 A * | 3/1994 | Gould | ............... | 370/410 |
| 5,440,542 A * | 8/1995 | Procter et al. | ............... | 370/335 |
| 5,896,368 A | 4/1999 | Dahlman et al. | | |
| 6,535,495 B1 * | 3/2003 | Moulsley | ............... | 370/335 |
| 6,747,963 B1 | 6/2004 | Park et al. | | |

OTHER PUBLICATIONS

European Search Report, dated Mar. 15, 2004.

* cited by examiner

*Primary Examiner* — Steve D Agosta
(74) *Attorney, Agent, or Firm* — Carlson, Gaskey & Olds PC

(57) ABSTRACT

A system and method for wireless communication includes multiplexing an EUDC downlink control channel so that it is transmitted like a downlink dedicated channel (DL-DPCH). The EUDC downlink control channel can be multiplexed with the DL-DPCH by code or by both code and time. The EUDC downlink control channel may be multiplexed with a downlink dedicated physical data channel (DL-DPDCH), a downlink dedicated physical control channel (DL-DPCCH), or both. In one embodiment, the EUDC downlink control channel is multiplexed by adding a multicode channel to a current DL-DPCH and treating the EUDC downlink control channel as a dedicated channel with power control functionality.

20 Claims, 2 Drawing Sheets

METHOD FOR CARRYING DOWNLINK CONTROL INFORMATION FOR AN ENHANCED UPLINK DEDICATED CHANNEL

BACKGROUND OF THE INVENTION

1. Field of the Invention

The present invention relates to wireless communication systems.

2. Description of the Related Art

Wireless communications system employ a number of geographically distributed cellular communication sites or base stations. FIG. 1 illustrates a representative wireless communications system 20 showing a base station 22 that supports transmission and reception of communication signals to and from various stationary or movable devices serving as mobile stations 23, such as a wireless phone 24, a personal digital assistant 26, or a computer 28. The base station 22 includes a system controller 30 that includes known radio equipment and signal processing equipment that generate and process data and communication signals in a wireless network.

In one embodiment, each base station 22 may transmit and receive signals to and from the mobile devices via an antenna 32 mounted on a tower 38. The controller 30 may include the necessary electronics and software for deciphering and managing signals received by the antenna 32 and for generating or transmitting the signals necessary to achieve the communications desired at the mobile stations 23 within the network. Note that the devices serving as mobile stations 23 may actually be stationary or fixed.

Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contagions communications coverage within the outer boundaries of the system.

When active, a mobile device receives signals from at least one base station 22 over a forward link or downlink and transmits signals to at least one base station over a reverse link or uplink. Several approaches have been developed for defining links or channels in a cellular communication system, including, for example, TDMA (time-division multiple access), and CDMA (code-division multiple access).

In TDMA communication systems, the radio spectrum is divided into time slots. Each time slot allows only one user to transmit and/or receive. Thusly, TDMA requires precise timing between the transmitter and receiver so that each user may transmit their information during their allocated time.

In CDMA communications systems, different wireless channels are distinguished by different channelization codes or sequences. These district channelization codes are used to encode different information streams, which may then be modulated at one or more different carrier frequencies for simultaneous transmission. A receiver may recover a particular stream from a received signal using the appropriate code or sequence to decode the received signal.

With the explosion of the Internet and the increasing demand for data, resource management has become a growing issue in cellular communication systems. Next generation wireless communication systems, such as those employing an Enhanced Uplink Dedicated Channel ("EUDC"), are expected to provide high rate packet data services in support of Internet access and multimedia communication. Even though the EUDC focuses on providing high-speed data on an uplink channel, the EUDC still requires a supporting downlink channel to carry control information (e.g., power level, channelization codes, etc.) from the base station 22 to the mobile station so that the mobile station will know how to transmit data on the uplink.

While it may be possible to construct new shared control channels on the downlink to handle the EUDC control information, creating new shared channels may require large downlink capacities. New shared channels require high amounts of transmission power to meet transmission performance requirements, but high transmission power also generates downlink inter-cell and intra-cell interference due to non-orthogonality among adjacent cells and a multipath effect. Further, there may be mobile stations that cannot support EUDC control information over a new channel without additional hardware, making implementation of high-speed transmissions less convenient.

There is a desire for a system and method that allows EUDC control information to be sent on a downlink channel to mobile stations while minimizing interference.

There is also a desire for a system and method that enables mobile stations to support EUDC control information without requiring extensive hardware modifications.

SUMMARY OF THE INVENTION

The present invention is directed to a communication method comprising the steps of providing control information in a base station and multiplexing the downlink control channel with a downlink dedicated channel. The control information corresponds to an uplink channel on a downlink control channel.

In one embodiment, the method multiplexes an EUDC downlink control channel so that it is transmitted like a downlink dedicated physical channel (DL-DPCH). The EUDC control channel can be multiplexed with the DL-DPCH by code or by both code and time. The EUDC downlink control channel may be multiplexed with a downlink dedicated physical data channel (DL-DPDCH), a downlink dedicated physical control channel (DL-DPCCH), or both.

In one embodiment, the EUDC control channel is multiplexed by adding a multicode channel to a current DL-DPCH. As a result, the EUDC downlink control channel is transmitted to the mobile station as if it were another DL-DPCH multicode channel. By treating the EUDC downlink control channel like a DL-DPCH, the invention does not require construction of a new, shared channel to carry the EUDC downlink control information. Further, using an existing DL-DPCH functionality to carry EUDC information has no effect on the hardware implementation of mobile stations that do not support EUDC.

DETAILED DESCRIPTION

Figure 1:
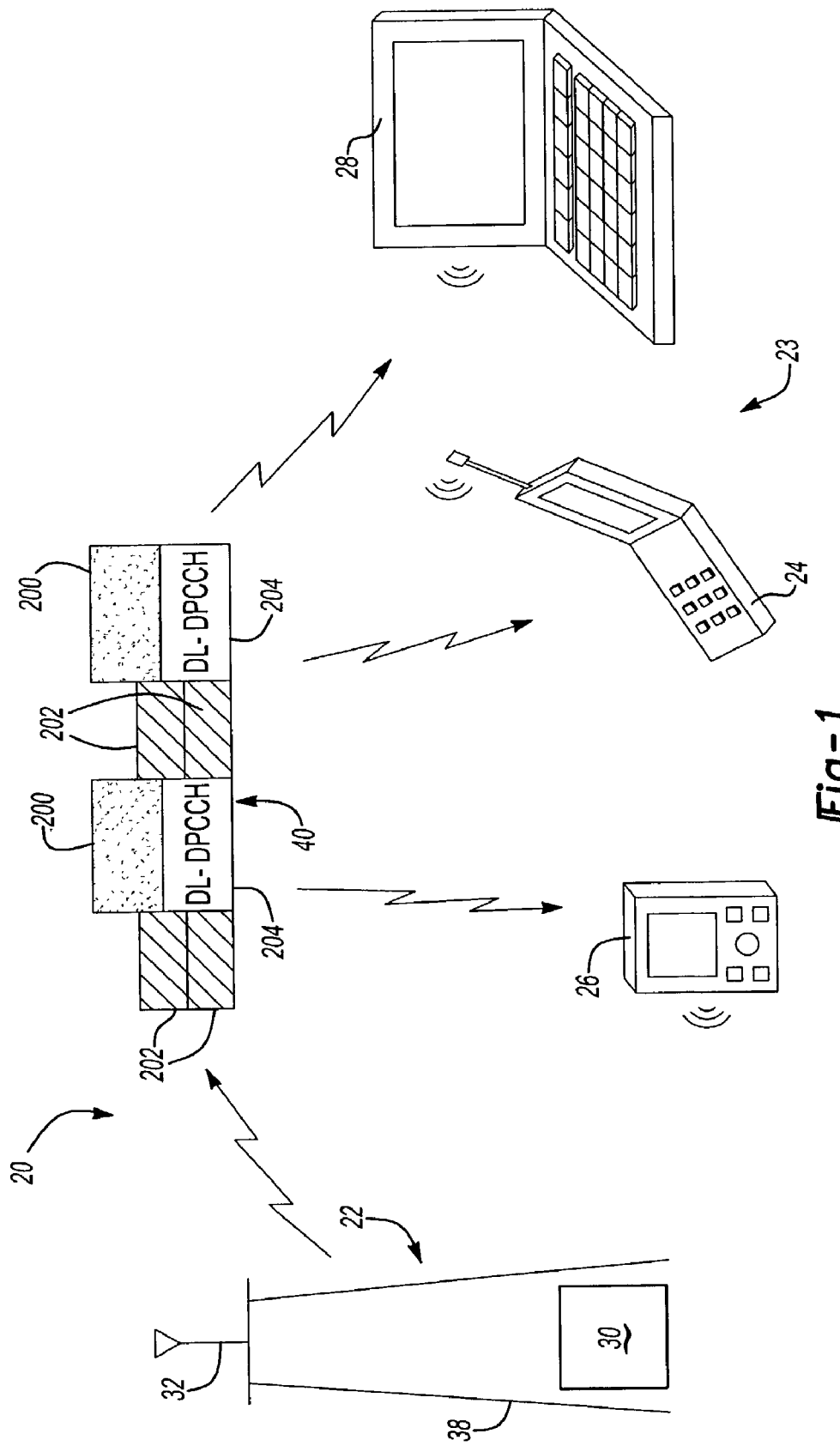
FIG. 1 depicts an operating environment of the present invention.
Figure 2:
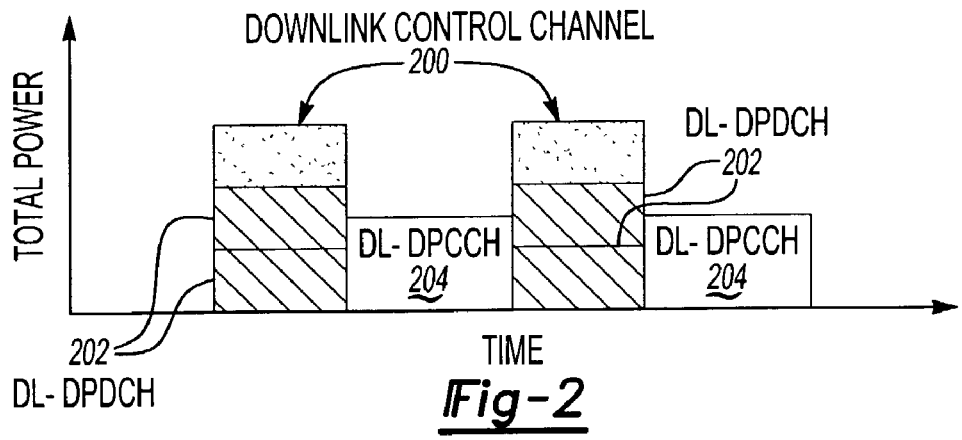
FIG. 2 depicts one embodiment of the invention.
Figure 3:
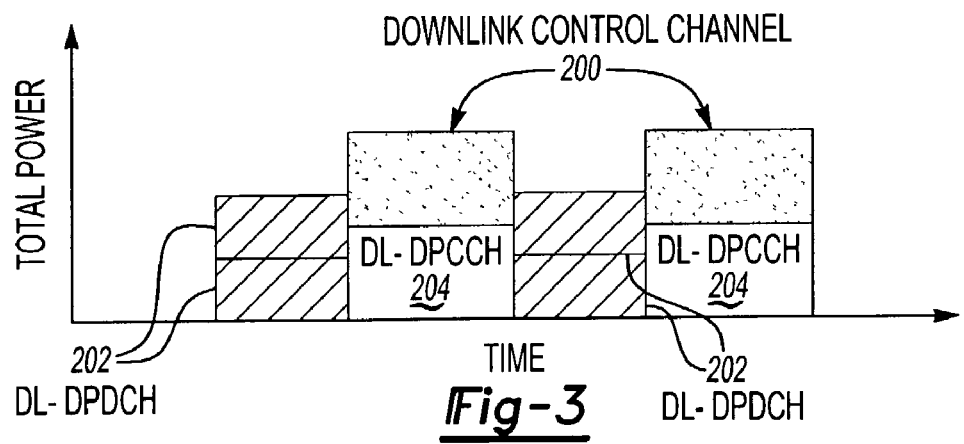
FIG. 3 depicts another embodiment of the invention.
Figure 4:
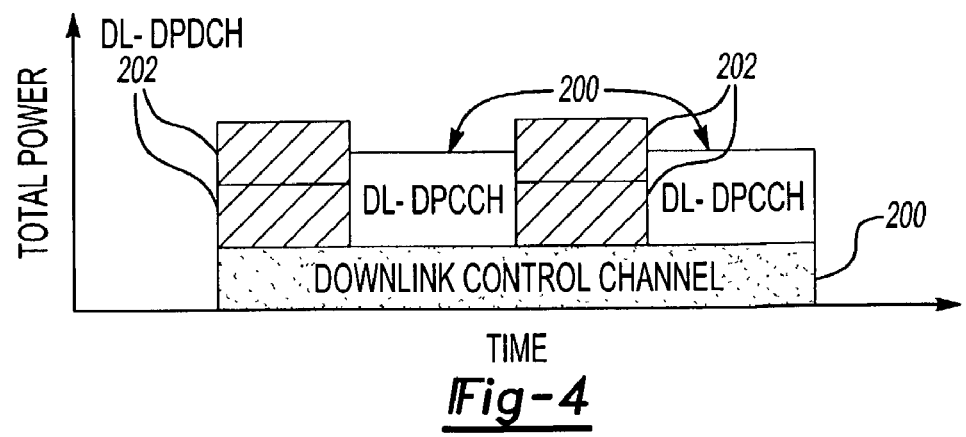
FIG. 4 depicts yet another embodiment of the invention.

Referring to FIGS. 2 through 4, the invention generally entails code-multiplexing a downlink control channel on a downlink dedicated channel. The examples shown in the figures focus on code-multiplexing an EUDC downlink control channel 200 upon an already-existing universal mobile telecommunications system (UMTS) downlink dedicated physical channel, or DL-DPCH. The DL-DPCH can either be a dedicated data channel (DL-DPDCH) 202 or a dedicated control channel (DL-DPCCH) 204. For clarity, the term "DL-DPCH" will be used as a generic term for both the DL-DPDCH 202 and DL-DPCCH 204 when appropriate. The EUDC downlink control channel may be assigned a particular channelization code during an initial set up process so that the mobile station 23 will recognize the EUDC downlink control channel 200 even though it is multiplexed with the DL-DPCH. In one embodiment, the base station 22 notifies the mobile stations 23 of the specific method used to multiplex the EUDC downlink control channel 200 with the DL-DPCH so that the mobile stations 23 can distinguish the EUDC control information from the DL-DPCH information. In another embodiment, the specific multiplexing method is dictated by a wireless communication standard. By code-multiplexing the EUDC downlink control information 200 upon the DL-DPCH, the EUDC downlink control information 200 can be transmitted to the mobile station 23 as if the EUDC downlink control information 200 were a part of the DL-DPCH.

The codes used for the code-multiplexing can be, for example, spreading codes generated in any known manner. Examples include a primary scrambling code plus orthogonal variable spreading factor (OVSF) codes, or a secondary scrambling code plus OVSF codes. The OVSF codes can either have the same spreading factor or a different spreading factor as the spreading factor of the multiplexed DL-DPCH.

FIG. 2 represents one way of code-multiplexing a EUDC downlink control channel 200 according to one embodiment of the invention. In this embodiment, the EUDC downlink control channel 200 is a multicode channel added to the existing DL-DPDCH 202. The EUDC downlink control channel 200 is both code-multiplexed with respect to the DL-DPDCH multicode channels 202 and time-multiplexed with the DL-DPCCH 204. As a result, EUDC downlink control signals are carried to the mobile station 23 over the EUDC downlink control channel 200 as if the control channel 200 was simply another multicode channel for the DL-DPDCH 202. As shown in FIG. 2, the EUDC control channel 200 and the DL-DPDCH multicode channels 202 will transmit at the same time and will alternate transmission with the DL-DPCCH 204.

Because the mobile station 23 sends an uplink packet data transmission request before the base station 22 responds with any control information, the mobile stations 23 know when and how to de-multiplex and decode the EUDC downlink control channel 200. Further, because control channel information is normally protected by error detection codes, such as a cyclic redundancy check (CRC) code, the mobile station 23 will be able to detect whether or not it is receiving valid EUDC downlink control information.

FIG. 3 illustrates another way in which the EUDC downlink control channel 200 can be multiplexed upon a DL-DPCH. In this embodiment, the EUDC downlink control channel 200 is code-multiplexed with the control channel DL-DPCCH 204 rather than a data channel. Like the embodiment shown in FIG. 2, the DL-DPDCH 202 and the DL-DPCCH 204 are time multiplexed and alternate transmission over time.

In this embodiment, control information is transmitted over the EUDC downlink control channel 200 at the same time that the DL-DPCCH 204 is transmitted. More particularly, the EUDC downlink control channel 200 is code-multiplexed with the DL-DPCCH 204 as if it were a multicode channel to the DL-DPCCH 204.

Because data and control information are transmitted at different times in this embodiment (FIG. 3) rather than at the same time (FIG. 2), the mobile station 23 does not need to separate information received at a given time into data and control information. Instead, the mobile station 23 will be able to treat all information received at a given time the same way because it will either be all data or all control information, with the DL-DPDCH 202, the DL-DPDCH 204, and the EUDC downlink control channel 200 distinguishable by their associated channelization codes.

FIG. 4 shows yet another possible embodiment of the invention. Rather than code-multiplexing the EUDC downlink control channel 200 by adding a multicode channel to either the DL-DPDCH 202 or the DL-DPCCH 204, the embodiment shown in FIG. 4 adds a multicode channel to both the DL-DPDCH 202 and the DL-DPCCH 204. Code multiplexing is the only type of multiplexing used to distinguish the EUDC downlink control channel 200 from the DL-DPCH in this embodiment; time multiplexing is not used for the EUDC downlink channel 200 because it is transmitting continuously. Instead, the channelization code associated with the EUDC downlink control channel 200 allows the mobile station 23 to distinguish the EUDC downlink control channel 200 from the DL-DPCH being transmitted at the same time, regardless of whether the DL-DPCH is the DL-DPDCH 202 or the DL-DPCCH 204. In this embodiment, time multiplexing is still used to alternate transmission of the DL-DPDCH 202 and the DL-DPCCH 204.

Depending on the specific way in which the EUDC downlink control channel 200 is multiplexed with the DL-DPCH, more than one code channel may added to the DL-DPCH to accommodate the EUDC control information. For example, if the EUDC control channel 200 is code-multiplexed only with the DL-DPCCH 204, a single code channel may not provide enough room to carry all the EUDC control information. In such a case, additional multicode channels may be added to the DL-DPCCH 204 to accommodate the EUDC control channel 200. Other instances where more than one multicode channel is added to the DL-DPCH also fall within the scope of the invention.

By treating the EUDC control channel 200 like a DL-DPCH multicode channel, as shown in FIGS. 2 through 4, the EUDC control channel 200 can be transmitted even if there is no other DL-DPCH transmitted at the same time; in such a case, the EUDC control channel 200 would be transmitted to the mobile station 23 as if it were a single multicode DL-DPCH. Also, because the EUDC downlink control channel 200 is power-controlled and transmitted like a normal DL-DPCH, its receiving performance can be guaranteed while lowering interference to other mobile stations 23. Further, the invention allows simultaneous transmission of EUDC control channel information to multiple mobile stations 23 in the same way that multiple DL-DPCH information can be simultaneously and respectively transmitted to multiple mobile stations 23.

By multiplexing the EUDC control channel 200 to an existing DL-DPCH, mobile stations 23 having the EUDC function turned on can handle the EUDC control channel 200 with existing hardware even if the hardware is not originally designed to support EUDC. Meanwhile, the mobile stations with EUDC function turned off can operate as if there were no EUDC control channels on the downlink.

Further, if a secondary scrambling code is allowed in the system, it can be applied in the code multiplexing of all downlink dedicated channels that are assigned to selected mobile devices 23 and that include the EUDC downlink control channel 200. In this way, channels spread by the secondary scrambling code can reside in the entire OVSF code space, saving OVSF code space associated with the primary scrambling code and reducing downlink capacity loss caused by OVSF code usage on the EUDC downlink control channel 200. Treating the EUDC downlink control channel 200 as a dedicated channel according to the present invention allows the mobile station 23 to avoid having to de-spread with two different scrambling codes, thereby reducing implementation complexity.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A communication method, comprising:
   providing control information to a mobile station so that the mobile station will know how to transmit data on an enhanced uplink dedicated channel (EUDC);
   providing the control information to the mobile station on a EUDC downlink control channel; and
   code-multiplexing the EUDC downlink control channel with a downlink dedicated channel;
   wherein the code-multiplexing step comprises:
      providing a primary scrambling code and a secondary scrambling code; and
      code-multiplexing the EUDC downlink control channel using the secondary scrambling code.

2. The communication method of claim 1, wherein the downlink dedicated channel comprises a downlink dedicated data channel and a downlink dedicated control channel, and comprising code-multiplexing the EUDC downlink control channel with at least one of the downlink dedicated data channel or the downlink dedicated control channel.

3. The communication method of claim 2, comprising code-multiplexing the EUDC downlink control channel with both the downlink dedicated data channel and the downlink dedicated control channel.

4. The communication method of claim 1, comprising time-multiplexing the EUDC downlink control channel with the downlink dedicated channel.

5. The communication method of claim 1, wherein the EUDC downlink dedicated channel comprises a downlink dedicated data channel and a downlink dedicated control channel that are time-multiplexed with respect to each other.

6. The communication method of claim 5, wherein the EUDC downlink control channel is code-multiplexed with the downlink dedicated data channel and time-multiplexed with the downlink dedicated control channel.

7. The communication method of claim 5, wherein the EUDC downlink control channel is time-multiplexed with the downlink dedicated data channel and is code-multiplexed with the downlink dedicated control channel.

8. The communication method of claim 1, wherein the EUDC downlink control channel and the downlink dedicated channel are multiplexed such that the downlink control channel and the downlink dedicated channel share power control.

9. The communication method of claim 1, wherein the downlink dedicated channel is an already-existing universal mobile telecommunications system (UMTS) downlink dedicated physical channel.

10. A communication method, comprising:
    providing control information to a mobile station so that the mobile station will know how to transmit data on an enhanced uplink dedicated channel (EUDC);
    providing the control information to the mobile station on a EUDC downlink control channel;
    code-multiplexing the EUDC downlink control channel with a downlink dedicated channel;
    wherein the EUDC downlink dedicated channel comprises a downlink dedicated data channel and a downlink dedicated control channel that are time-multiplexed with respect to each other;
    wherein the EUDC downlink control channel time-multiplexed with the downlink dedicated data channel; and
    wherein the EUDC downlink control channel is code-multiplexed with the downlink dedicated control channel as at least one multicode channel.

11. A communication method in which a mobile station uses an enhanced uplink dedicated channel (EUDC), comprising the steps of:
    receiving a EUDC downlink control channel and a downlink dedicated channel at the mobile station, wherein the EUDC downlink control channel has control information so that the mobile station will know how to transmit data on the EUDC and wherein the EUDC downlink control channel is code-multiplexed with the downlink dedicated channel;
    code-demultiplexing the EUDC downlink control channel and the downlink dedicated channel; and
    transmitting from the mobile station on the EUDC based on the received control information;
    wherein the code-demultiplexing step is conducted based on a secondary scrambling code that is separate from a primary scrambling code.

12. The communication method of claim 11, wherein the downlink dedicated channel comprises a downlink dedicated data channel and a downlink dedicated control channel, and comprising code-demultiplexing the EUDC downlink control channel and at least one of the downlink dedicated data channel or the downlink dedicated control channel.

13. The communication method of claim 12, comprising code-demultiplexing the EUDC downlink control channel and both the downlink dedicated data channel and the downlink dedicated control channel.

14. The communication method of claim 11, comprising time-demultiplexing the EUDC downlink control channel and the downlink dedicated channel.

15. The communication method of claim 11, wherein the downlink dedicated channel comprises a downlink dedicated data channel and a downlink dedicated control channel that are time-multiplexed with respect to each other.

16. The communication method of claim 15, comprising code-demultiplexing the EUDC downlink control channel and downlink dedicated data channel and time-demultiplexing the EUDC downlink control channel and the downlink dedicated control channel.

17. The communication method of claim 15, comprising time-demultiplexing the EUDC downlink control channel and downlink dedicated data channel and code-demultiplexing the EUDC downlink control channel and the downlink dedicated control channel.

18. The communication method of claim 11, wherein the receiving step comprises receiving the EUDC downlink control channel and the downlink dedicated channel using hardware adapted to receive the downlink dedicated channel.

19. The communication method of claim 11, wherein the downlink dedicated channel is an already-existing universal mobile telecommunications system (UMTS) downlink dedicated channel.

20. A communication method in which a mobile station uses an enhanced uplink dedicated channel (EUDC), comprising the steps of:

receiving a EUDC downlink control channel and a downlink dedicated channel at the mobile station, wherein the EUDC downlink control channel has control information so that the mobile station will know how to transmit data on the EUDC and wherein the EUDC downlink control channel is code-multiplexed with the downlink dedicated channel, and wherein the downlink dedicated channel comprises a downlink dedicated data channel and a downlink dedicated control channel that are time-multiplexed with respect to each other;

code-demultiplexing the EUDC downlink control channel and the downlink dedicated channel; and transmitting from the mobile station on the EUDC based on the received control information;

time-demultiplexing the EUDC downlink control channel and downlink dedicated channel; and code-demultiplexing the EUDC downlink control channel and the downlink dedicated control channel by treating the EUDC downlink control channel as at least one multicode channel.

\* \* \* \* \*